United States Patent [19]

Ekstrom

[11] Patent Number: 5,324,940
[45] Date of Patent: Jun. 28, 1994

[54] COLOR-ENCODED FLUORESCENT VISIBLE IMPLANT TAGS AND METHOD FOR IDENTIFICATION OF A MACRO-ORGANISM THEREWITH

[75] Inventor: Philip A. Ekstrom, Shaw Island, Wash.

[73] Assignee: Northwest Marine Technology, Inc., Shaw Island, Wash.

[21] Appl. No.: 907,411

[22] Filed: Jul. 1, 1992

[51] Int. Cl.[5] .......................... G09F 3/08; G01N 21/64; A01K 61/00

[52] U.S. Cl. ................................ 250/302; 250/458.1; 250/459.1; 250/461.1; 40/300; 119/215; 606/117

[58] Field of Search ........................ 250/302, 271, 458.1, 250/459.1, 461.1, 486.1; 40/300; 119/3; 128/899; 606/117

[56] References Cited

U.S. PATENT DOCUMENTS

| | | | |
|---|---|---|---|
| 1,891,348 | 12/1932 | Ellinger et al. | 250/302 |
| 3,128,744 | 4/1964 | Jefferts et al. | 119/3 |
| 3,513,320 | 5/1970 | Weldon | 250/271 X |
| 3,679,559 | 7/1987 | Jefferts | 40/300 X |
| 3,772,099 | 11/1973 | Ryan et al. | 250/302 X |
| 3,956,630 | 5/1976 | Mellows | 250/302 |
| 3,963,351 | 6/1976 | Chance et al. | 250/458.1 X |
| 4,392,236 | 7/1983 | Sandstrom | 378/45 |
| 4,750,490 | 7/1988 | Haw | 40/300 X |
| 4,790,090 | 12/1988 | Sharber | 40/300 |

FOREIGN PATENT DOCUMENTS 3841051 6/1990 Fed. Rep. of Germany ...... 606/117

OTHER PUBLICATIONS

Dickerson et al., 'Sequential-Readout Identification Tag', IBM Technical Disclosure Bulletin, vol. 17, No. 3, 1974, pp. 782-783.

Primary Examiner—Carolyn E. Fields
Assistant Examiner—Edward J. Glick
Attorney, Agent, or Firm—Kenyon & Kenyon

[57] ABSTRACT

For the identification of macro-organisms, especially fish, visible implant tags having identification codes of fluorescent colorants are implanted into at least partially transparent tissue of the macro-organisms such that the visible implant tags are visible. The encoded information is obtained from the tags by measuring the spectrum of light emitted by the fluorescent colorants. The tagged fish need not be captured to read the tags. The information may be obtained through a significant depth of medium and also independently of the size of the tag or its orientation. Florescent dyes or, more preferably, fluorescent pigments may be used for the identification codes.

12 Claims, 3 Drawing Sheets

SPECTRAL CHANNELS: | BLUE | YELLOW | RED |

SPECTRAL CHANNELS: | BLUE | GREEN | YELLOW | RED |

COLOR-ENCODED FLUORESCENT VISIBLE IMPLANT TAGS AND METHOD FOR IDENTIFICATION OF A MACRO-ORGANISM THEREWITH

BACKGROUND OF THE INVENTION

1. Field of the Invention

The present invention relates to a method for tagging macro-organisms, especially fish, for identification purposes. More particularly, this invention concerns the use of visible implant tags encoded with fluorescent dyes or, more preferably, fluorescent pigments and various methods for reading the code.

2. Description of Related Art

The use of visible implant tags for identifying macro-organisms has been disclosed elsewhere as has the use of fluorescent colorants for identifying macro-organisms. These methods generally require the capture of the macro-organism to be identified and/or the use of sophisticated equipment to locate and read the tag.

U.S. Pat. No. 4,750,490 to Haw et al., the disclosure of which is incorporated herein by reference, discloses the use of visible implant tags for the identification of fish. The tags are implanted into transparent or semi-transparent tissue. Upon capture of the fish, the location of the visible implant tags can be ascertained visually and the tag can be excised and read, or read through the transparent or semitransparent tissue. The visible implant tags may have information encoded thereon as indentations forming binary words, as alpha-numeric codes, or as shapes of visually differentiable colors. This information may be read optically either manually or mechanically.

U.S. Pat. No. 4,392,236 to Sandstram et al. describes an animal identification system utilizing fluorescent implanted tags coded with one or more higher atomic number chemical elements and an automated method for reading the coded information. The tags are read by inserting the animal, a fish, into a specimen holder which is in turn inserted into a machine designed to expose only the tag to x-rays, while masking the rest of the fish, and measuring the fluorescent X-radiation. Alternatively, a variation was contemplated in which a tagged animal could be allowed limited movement in a confined channel and a three-dimensional locating and tracking means could control the application of the X-ray beam to only the tag.

SUMMARY OF THE INVENTION

An object of the present invention is to provide an improved method for identifying macro-organisms, especially fish, by tagging.

Another object of the present invention is to provide such a method wherein macro-organisms are identified by means of a tag encoded with fluorescent colorants and implanted within transparent or partially transparent body tissue of the macro-organism.

Another object of the present invention is to provide such a method wherein each tag is encoded by a fluorescent dye or a mixture of a second fluorescent dye and at least one normally invisible blue fluorescent dye.

Another object of the present invention is to provide such a method wherein each tag is encoded by a fluorescent pigment or a mixture of fluorescent pigments.

A further object of the present invention is to provide such an identification method wherein information on the implanted tag can be read visually while the tag is still disposed within the body tissues of the macro-organism.

A still further object of the present invention is to provide such an identification means wherein the tag can be read independently of its size, its orientation, or the intensity of the illumination.

A still further object of the present invention is to provide such a method wherein the tag can be read by a machine, and masking is not required.

A further object of the present invention is to provide such a method which may be utilized through a significant depth of medium, which depth may be changing.

In accordance with the present invention, a method for tagging a macro-organism, especially a fish, wherein the macro-organism has a region of at least partially transparent tissue is provided. The method comprises the steps of providing a tag having one or more fluorescent colorants forming an identification code, embedding the tag into the partially transparent or transparent tissue, illuminating the tag, and reading the spectrum of the fluorescent light emitted by the tag, preferably with a machine. Since the coding of the information is based only on the shape of the spectrum of emitted light, it is not necessary to closely control the size of the tag, its apparent size due to distance variations or its orientation, or the intensity of the illumination.

Pursuant to another embodiment of the present invention, the wavelength range of the illuminating light is completely out of the range of the emitted light. By using a source filter which will pass illuminating light needed for fluorescence and an observing filter which will pass light emitted by the fluorescent colorants, the observing instrument will not respond to the illuminating light. As a result of this filtering arrangement, the observing instrument need not be masked or shielded and will still detect the tag while observing a substantial portion of the tagged macro-organism or even the whole scene.

The fluorescent colorants of the present invention may be either dyes or pigments. If dyes are used, a single dye per tag may be used, or a mixture of at least one "invisible blue" dye (also known as "optical brightener") and one other dye per tag may be used to increase the number of codes available as well as to decrease the likelihood of counterfeiting. A single pigment per tag or a mixture of pigments per tag may also be used for these purposes.

Pursuant to another embodiment of the present invention, the tags can be read through a significant depth of medium, even if the medium's absorption is not spectrally neutral. Embodiments are also provided which resist or account for fading of the dye or pigment colorants.

DETAILED DESCRIPTION

Figure 1:
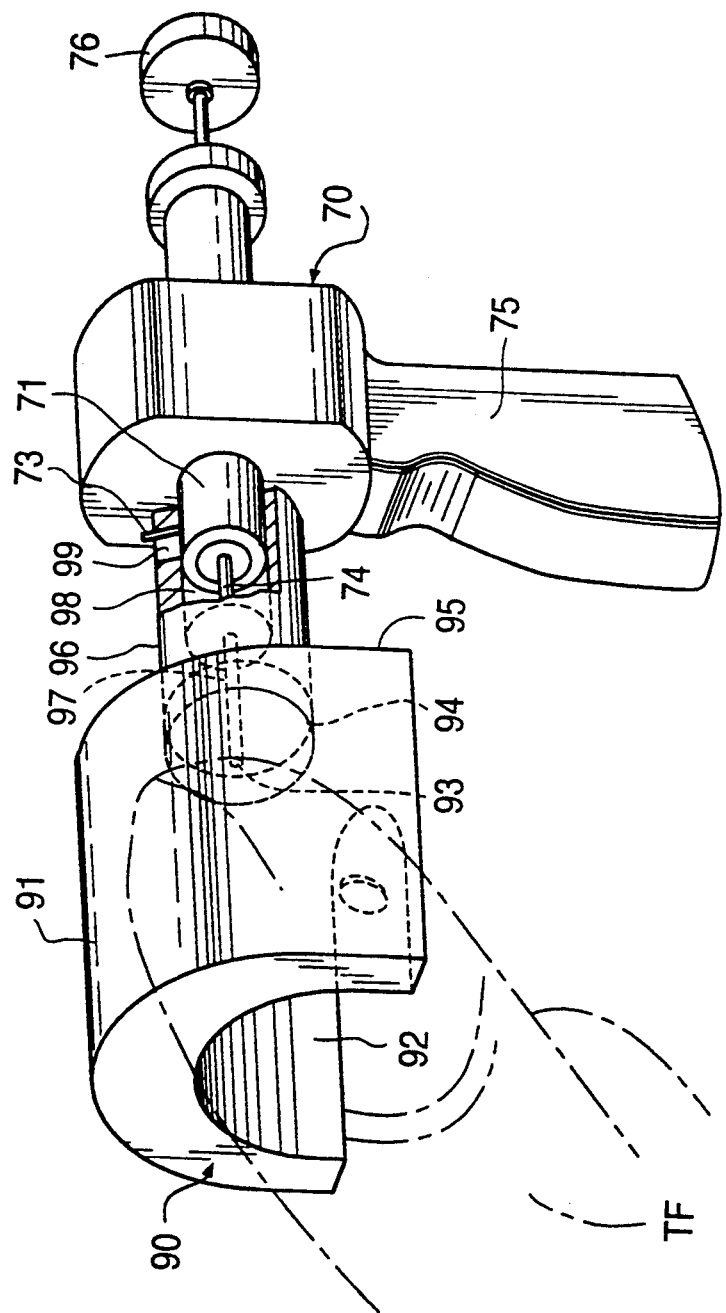
FIG. 1 shows a known device for implanting tags into macro-organisms.

The present invention concerns visible implant tags to be used for the identification of macro-organisms. Visible implant tags are pieces of material carrying a distinctive mark or marks. They are inserted in transparent tissue of fish or other animals in such a manner as to be visible and readable optically from outside the macro-organism. Various methods for implanting identification tags which are known in the art may be used, including those disclosed in U.S. Pat. Nos. 3,820,545 and 3,313,301, the disclosures of which are incorporated herein by reference in which a tag is injected into a macro-organism by a hypodermic needle device. One of these known instruments for implanting tags into macro-organisms is shown in FIG. 1. This instrument comprises a tag implanter structure 70, and a housing 90, in which the macro-organism is maintained in a predetermined position to receive the tag at a proper locale therein. Housing 90 is formed by a partial cylindrical mold 91, of transparent plastic, having a large cavity 92 opening at its bottom and through one end thereof, which is specially contoured to receive therein a portion of a macro-organism. As shown in FIG. 1 by the dot and dash outline within the cavity 92, the macro-organism is brought into position with the region to receive the tag in line with an opening 93 at the end of a small bore conduit 94 passing through the end wall 95 of the cavity.

Into a cylindrical depression of the end wall 95, is tightly fitted or screwed, the forward end of an adapter or connector element 96. A further small bore conduit 97 passing centrally through this adapter, is aligned with the housing conduit 94, and opens into a relatively wide cylindrical aperture 98 extending about mid-way into the adapter 96, from an opening at the rear end thereof. Implanter 70 is provided with a short cylindrical band 71, fixed to its forward clamping collar or ring, by a pin 73 which extends outwardly, normal to the band, and is adapted to ride in a slot 99, cut through the cylindrical wall forming the aperture 98. When assembled, an extended needle structure 74 of the implanter 70, slip fits through the aligned conduits 94 and 97, and its band 71 slip fits within the cylindrical sleeve defined by the aperture 98 of the adapter 96. As indicated by the showing in FIG. 3, the extended or sharpened end of needle 74, remains just within the opening 93, when the pin 73 contacts the far end of slot 99. Moreover, the forward longitudinal displacement of the structure 70 relative to housing 90 is limited to the total length of the slot 99. It is evident therefore that by means of this arrangement, the length of needle received within cavity 92, and available for entry into the fish, is predetermined by the length of the slot provided in the adapter element 96.

Figure 2:
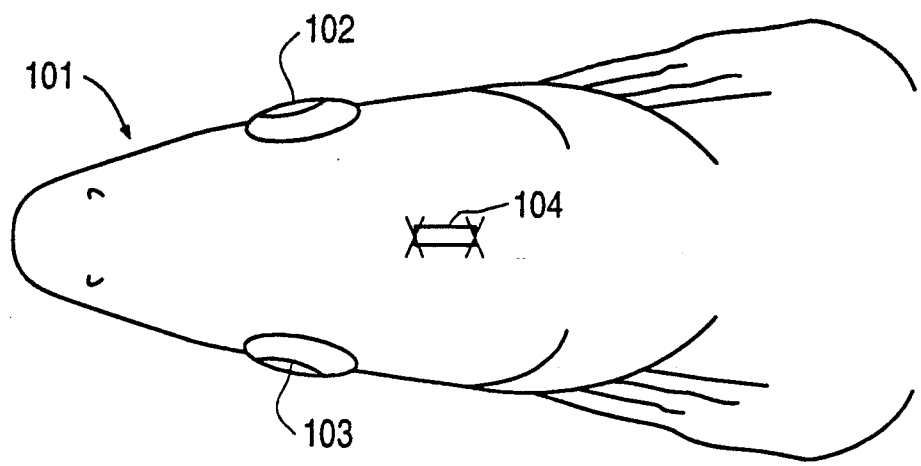
FIG. 2 shows a schematic dorsal view of a fish with a visible implant tag implanted between the skull and dermis of the fish.

Tagging macro-organisms using the instrument according to the invention as shown in FIG. 1, requires that the macro-organism be held securely in one hand, to position its head within the conforming contour of the housing cavity 92, such that an area on the forward portion of the head is placed against needle conduit opening 93. Implanter 70, which is essentially a device in the nature of that disclosed in the aforementioned patents to Hickey and White, is additionally equipped with a handle 75 to be gripped by a free hand, or secured in a vise. Thus, the point of needle 74, preloaded with a tag can be conveniently manipulated to be forced through the skin of the fish and stopped at a point preset by the length of slot 99. Immediately thereafter the plunger within the needle 74 would be actuated by an inward depression of its thumb button 76, whereby the tag 104 is pushed into the macro-organism at the preset point. Upon release of the plunger, the operation is reversed such that the button 76 is retracted with the plunger, and the needle is separated from the fish and consequently retracted back to bring its point into the opening 93. Accordingly, the instrument of FIG. 1 constitutes a practical and safe means to insure that the tag implanted thereby is securely retained at very nearly the same area of each fish so processed. FIG. 2 shows the result of the use of the device of FIG. 1, with the implant tag 104 implanted between the skull and dermis of a fish 101, between the fish's eyes 102. 103. Another method for injecting a tag is to utilize known methods of hypodermic needle injection of implant tags to inject a liquid elastomer mixed with a marker, which elastomer hardens upon insertion.

More specifically, the present invention concerns a method for identifying fish in which a fluorescent colorant is used as at least one component of the distinguishing mark or marks on a visible implant tag.

The present invention involves the use of multiple fluorescent colorants for encoding information and the extraction of that information by an observing instrument viewing the tag. The identity or proportions of colorants present in a given tag are determined by measuring the spectrum of the fluorescent light emitted by the tag. These observations are then interpreted as corresponding to some discrete code, such as a number, identifying the animal tagged as belonging to some particular group.

Fluorescent colorants all exhibit the property of wavelength conversion. They absorb light at one wavelength or band of wavelengths and re emit light of a different color, always at a longer wavelength. Commercially common colorants typically absorb light in the blue and ultraviolet, and re-emit other colors of the visible spectrum.

The first step in reading the code set forth by such fluorescent colorants in a tag is to separate out the fluorescent emission and reject the interfering contribution of ambient light. The illuminating instrument to be used to read such tags is a controllable source suitable for exciting fluorescence. The reading device also includes a device for determining, to an appropriate resolution, the spectrum of the light received back.

The tag may be shielded from any other sources of light in the wavelength range to be measured as well as is convenient. Then with the illuminating light turned off, the spectrum of the residual light coming from the tag and any surrounding material is measured. Finally, the illuminating light source is turned on and the observed spectrum measured. Subtracting the first spectrum from the second spectrum obtained yields the spectrum of the additional light returned by the tag and its surroundings as a result of the illuminating light source.

Fluorescent colorants provide a further advantage in that the extraneous effects of the illuminating source can be reduced because the wavelength range of the illuminating source can lie entirely outside the wavelength range in which one observes the fluorescent emission from the tag. Thus, it is possible to choose a filter for the illuminating source that will pass light suitable for exciting fluorescence and a filter for the observing instrument that will pass light emitted by the fluorescent colorants, and essentially provide that no light of any given wavelength will pass both filters. Preferably, the instrument based upon this filter construction does not respond to any of the illuminating light which is directly reflected by either the tag or by its surroundings when observing the tag.

In the absence of other fluorescent materials, the difference spectrum described above consists only of light emitted by the fluorescent colorants of the tag. This filter arrangement makes it practical to design convenient observing instruments which need not be either rigorously shielded from stray light or focused exclusively on the tag, but which instead observe a substantial portion of the animal bearing the tag or eve the entire scene or environment in which the macro-organism is found. For the remainder of the description of the present invention, it is presumed that such filters are used.

In the disclosed embodiments of the present invention the information is encoded in the shape of the observed spectrum alone, and not in the absolute intensity of the light. As a result, variations in such factors as the actual tag size, the apparent size of the tag due to distance variations, or the intensity of the illuminating source need not be closely controlled.

Figure 2B:
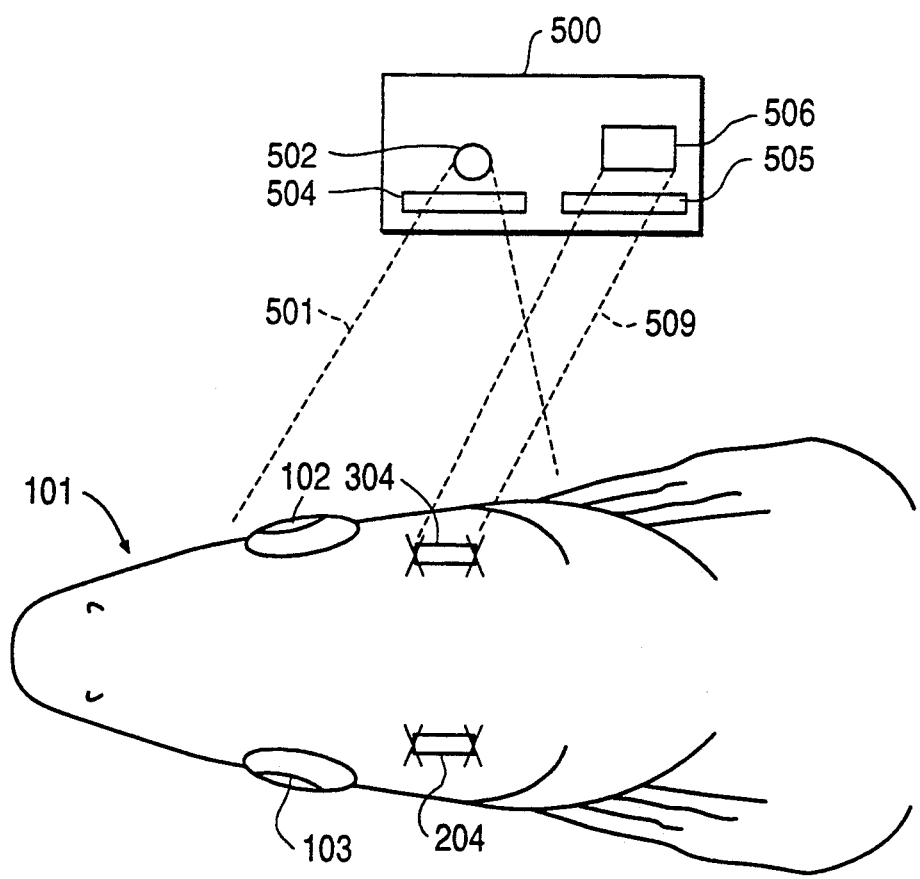
FIG. 2b shows the tag reading device of the present invention in use with tags of the present invention implanted between the skull and dermis of a fish.

FIG. 2b shows multiple tags 204, 304 of the present invention implanted on a fish 101, behind the fish's eyes 102, 103, and the reading device 500 of the present invention, which emits light 501 of a given spectrum. The light 501 is emitted from a light source 502, and light 501 passes through a filter 504 to ensure that it is within a specific wavelength range. When the light 501 impinges upon a tag 304, the tag 304 emits a fluorescent visible light 509. Fluorescent visible light 509 passes through a filter 505 which ensures that only fluorescent light within a specific wavelength range passes through to a detector 506. The detector 506 detects the wavelengths of the fluorescent light emitted 509 by a tag 304, and therefore is used to identify the code on the tag.

Figure 3:
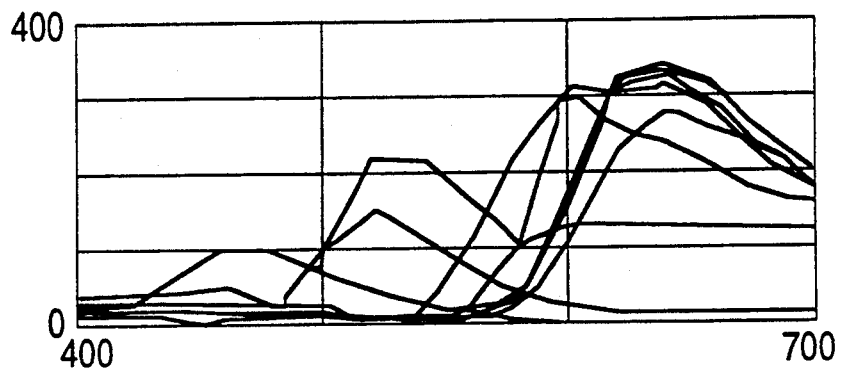
FIG. 3 is a plot of the intensity of the emitted light versus the wavelength of the emitted light, in which the emission spectra for all colorants in a product line are superimposed.
Figure 4:
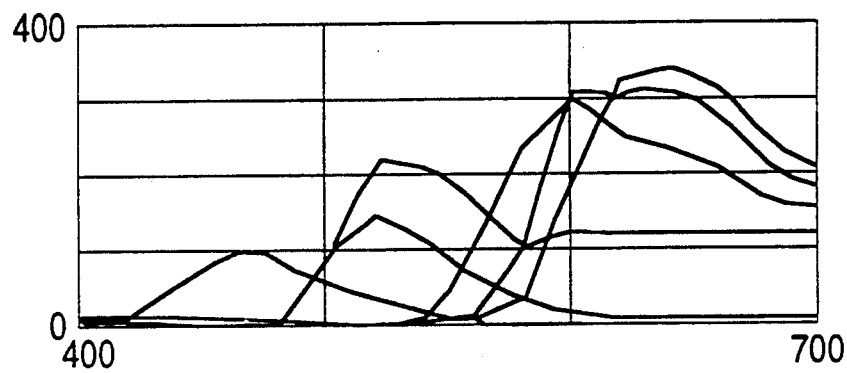
FIG. 4 is a plot of the intensity of the emitted light versus the wavelength of the emitted light, in which the colorants have been chosen to be readily distinguishable when only one is present in a given tag, and the three spectral channels of the emitted light are indicated below the abscissa.
Figure 5:
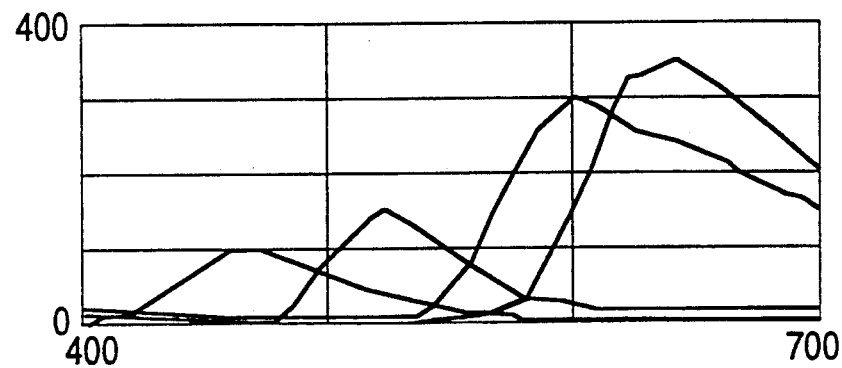
FIG. 5 is a plot of the intensity of the emitted light versus the wavelength of the emitted light, in which a mixture of four fluorescent pigments are shown, and the four corresponding spectral channels are indicated below the abscissa.

FIGS. 3-5 show three plots of the emission spectra of one set of commercially available fluorescent colorants. The abscissa in each case is the wavelength in nanometers, the ordinate may be considered to be arbitrary units of emitted light intensity. FIG. 3 shows superimposed emission spectra of all colorants in a product line. A number of the spectra shown differ from each other only subtly and would be difficult to distinguish reliably while others are clearly distinct. Note that the variety of colors available is far more limited than would be expected with reflective colorants.

Each colorant may be either a dye, which dissolves in or otherwise penetrates into the substance being colored and mixes intimately with it and with other dyes. Alternatively, the colorant could be a pigment which is incorporated as opaque particles which do not dissolve.

FIG. 4 shows superimposed the spectra of a set of dyes chosen to be readily distinguishable when only one appears in a given tag. Also indicated, just below the plot, are example spectral channels labelled red, yellow and blue corresponding roughly to the nominal color of light passed by a filter which would define each one. Note that the proportion of light falling in each channel is different for each dye. One dye contributes light almost entirely to the blue channel, one largely to the yellow, and the remainder in some proportion to the red and yellow channels. While the first two dyes are clearly distinguishable, in some instances it is not practical to distinguish among all of the others shown, and one or more of the red or orange ones may need to be discarded. Still one can see that there are at least four and perhaps six dyes in this particular commercially available line which can be distinguished by measurements made with a simple three-channel fluorescence spectrometer.

A dyed tag can provide between four and six codes indicated by choice of dye. Using one such tag on each side of the animal, the combined code capacity would be between 16 (using 4 colors) and 36 (using 6 colors).

If only four of the available dyes are used, the human eye is likely to be an adequate instrument for reliably distinguishing them when automatic data acquisition is not needed. The use of a color comparison chart for reference can expand the number of available colorants reliably distinguishable by eye.

Because fluorescent colorants are both subtractive (light-absorbing) and additive (light-emitting, as opposed to simply reflective), as dyes they do not necessarily mix to form new colors as would either pigments or phosphors. For example, the blue colorant corresponding to the leftmost peak of the emission plot has strong absorption (not shown) in both the red and ultraviolet regions of the spectrum. The red colorants which produce the emission peaks at the right of the plot absorb strongly in the blue. As a result, in a mixture of red and blue fluorescent dyes, the absorption of the blue dye interferes with the emission from the red one, and vice versa. If this interference is great enough, the result is likely to be rather than a desired fluorescent purple, an absorptive brown. Therefore, if we are using fluorescent dyes (as opposed to pigments), we may not be able to achieve a satisfactory result by mixing them together. However, there appears to be at least one specific choice in which the absorptions and emissions interfere to only a tolerable extent. In fact, any of the above fluorescent dyes could be mixed with one of the fluorescent dyes commonly referred to as "invisible blue" (invisible because they cannot be seen unless illuminated by ultraviolet light), which are also known as "optical brighteners" (because they are used in detergents as a fluorescent blueing). These dyes do not absorb at all in the visible region of the spectrum and would interfere only minimally with the other dyes considered, though their emission may be absorbed to some extent by the others. Since invisible blue dyes are normally invisible, their use could not only increase the number of available codes, but could also deter successful counterfeiting as counterfeiters would probably not check for a dye which emits under ultraviolet light when a dye is already visible to them under visible light.

In contrast to dyes, fluorescent pigments interfere with each other to a much smaller extent. One opaque pigment grain overlaying another may obscure it entirely, but if a given grain can be seen, it will make its full contribution to the emitted light. Therefore we can encode information not only by choice of one particular pigment from a list, but also by choice of proportions in a pigment mix. This allows us to tailor the observed spectrum more flexibly, encode more information and avoid counterfeiting if only mixtures of pigments are used, as mixtures of pigments are not commonly commercially available.

It is important whether or not the grains are substantially opaque: more precisely, whether they are optically dense at the wavelengths where they are active. If they are not, an overlaying particle will not entirely obscure an underlying particle and the particles will interfere with each other as do the dyes discussed above. Correction for this as an incipient effect is considered below.

FIG. 5 shows the spectra of four fluorescent pigments chosen for use in a pigment mixture. Again there are spectral channels shown, this time four in number as will be needed to determine the proportions of a four-component mixture. Note that the channels have been chosen to correspond to regions where the emission from each pigment predominates.

While all pigments contribute light to more than one channel, if interference between pigments may be neglected, a measure of the concentration of each pigment can be obtained as a linear combination of the intensities measured in each channel. The measuring instrument can be calibrated by making measurements with that instrument for all four channels on samples of the four pure pigments, forming a $4 \times 4$ matrix from the resulting 16 numbers, doing a one-time inversion of the $4 \times 4$ matrix, and entering the resulting sixteen weighting coefficients thus obtained into the instrument. The filter passbands can be chosen to optimize the condition number of the matrix to be inverted and the accuracy of the resulting measurements.

The extent of absorptive interference between pigments in a mix and the extent of the need to correct for it must be determined for any given pigment mix and application. However, if a substantial correction is needed, it is expected to be a non-linear one. If a linear correction were to be applied, then that would be equivalent to modifying the weighting coefficients determined as discussed above. Since such a modification would make the coefficients inappropriate to the case of pure colors, we should expect that any correction must instead be non-linear. A more detailed analysis of the expected interference suggests the same conclusion.

If the interference is moderate, then one possible means of correction is to adjust the proportions of the colorant mix to compensate. The form of the correction is obtained from the aforementioned inverted $4 \times 4$ matrix and can be arbitrarily non-linear as needed.

As mentioned before, only the shape of the observed spectrum is used. This is done by taking one pigment concentration measure, or alternately the output of one spectral channel, as a reference and dividing all concentrations or channel outputs by that reference. The largest of the concentration measures is a natural choice for the reference, and that choice will be assumed in the following.

The result of a measurement will then be a set of pigment proportions measured to some finite accuracy. The number of distinguishable proportions depends on the accuracy of measurement which is reliably attainable under field conditions. It is probable that at least four separate concentrations should be distinguishable for each pigment not used as a reference. There are reasons related to human observation of the tag to include a large concentration of red pigment in all cases. Choosing the red pigment as a reference, which would therefore carry no information, and using at least four distinct concentrations of the other three pigments, 64 ($4^3$) distinct tag codes are obtained.

If the restriction mentioned above is relaxed to allow either the red or the orange pigment to serve as reference, and if we again use four distinguishable concentrations, we obtain 112 codes based on the possible combinations of pigments and concentrations.

In case the tag is to be read through some significant depth of absorbing medium, the possibility that the absorption of the medium will not be spectrally neutral and will alter the shape of the observed spectrum must be considered. Water, particularly when other than pure, is an excellent example of such a medium. One solution to this problem is to limit the optical path through such a medium so that the differential absorption between any two channels is small, sufficiently small so that none of the standard pigment proportions can be mistaken for each other. This is easily achieved by using a hand held instrument on a captured fish.

The tolerance of the system to the effects of medium absorption and other multiplicative errors may be maximized by choosing the standard pigment proportions to be uniformly spaced on a logarithmic scale. The tolerance against stray light and other additive errors is maximized by choosing them to be uniformly spaced on a linear scale. The actual standard proportions chosen may be a compromise between these extreme cases.

If the medium's change in absorption varies with wavelength in a known and sufficiently regular manner, then a more elaborate method can be used to allow operation over longer optical paths. First, apparent relative proportions of two pigments which make predominant contributions to adjacent spectral windows are examined. If they do not exhibit exactly one of the expected standard ratios, correction is applied to all measured intensities by assuming that the length of path in the medium is that which corrects the absorption so as to imply the nearest accessible standard ratio. With this correction made, the path estimate is further refined by applying the same procedure to pigment pairs (or perhaps trios) which correspond to more widely spaced channels. Finally, all concentrations are included in a final refinement and all concentration ratios are verified to be acceptably close to standard.

This procedure depends upon having present in some concentration at least one pair of pigments which correspond to nearest neighbor spectral channels or, with somewhat less effectiveness, next nearest neighbor channels. There are therefore some additional restrictions on tag codes to be used which will facilitate reading them through dirty water.

Correction for absorption in a medium is most likely to be needed in a fixed installation such as where fish swim by a window. In that case the spectral properties of the water can be determined, automatically if desired, by measuring the spectrum of a test target often enough to track varying water properties. If the absorption becomes strong enough so as to incur risk of making an erroneous correction, that condition can be detected by this measurement with the test target.

Thus far it has been assumed that pigment or dye proportions remain stable once incorporated into a tag. Unfortunately some pigments and dyes are known to fade, particularly red ones and particularly some fluorescent ones. The extent of differential fading which might upset the chosen pigment proportions may limit the number of discrete relative concentrations which can be reliably distinguished in a mixture. In such a case, the coding scheme first discussed above, based on a variety of single colorants with only one pure colorant present in a given tag, offers the advantage of a spectrum which does not change its shape on fading.

Mixed systems are also possible which are robust against fading of red and yellow pigments. The invisible blue and violet pigments are expected to be more resistant to fading than the red ones. In particular, four concentrations of one pigment which are distinguishable as a fraction of the concentration of the other in a pair even after long exposure can be used. Allowing either to serve as reference gives seven combinations. Combining this with the presence of one red or yellow pigment drawn from a set of four, there are 28 combinations. Interference is conceivable here between absorption bands of the red or yellow pigment and emission of the blue and/or violet ones. Various correction schemes are possible, analogous to the corrections discussed above. All of the tags produced by this scheme are easily detectable by eye to serve as markers for fishermen. The information contained can be read out by a four-channel spectrometer: the channels needed would be violet, blue, yellow, and red. All pigment combinations are distinctive and unlikely to occur in any other context, and would therefore be resistant to counterfeiting.

The present invention provides a method for readily identifying a macro-organism with the use of fluorescent visible implant tags while overcoming the limitations of the prior art methods which require locating the tag and masking the rest of the macro-organism or focussing the beam of exciting energy onto the tag. Various embodiments described herein provide a method for the identification of large numbers of macro-organisms which, most importantly, does not require capture of the macro-organisms. Embodiments of the present invention are also described which provide a method for identifying macro-organisms that may be utilized in different media, and which are not affected by the purity of the medium, the intensity of illumination, attempted counterfeiting of the visible implant tags, fading of the visible implant tags, the size of the visible implant tags, nor the apparent size of the visible implant tags.

Although the invention has been described in terms of particular embodiments or modifications, one of ordinary skill in the art could generate additional embodiments and modifications within the scope of the claimed invention. Accordingly, the description and drawings herein are presented to facilitate an understanding of the present invention, not to limit the scope of the present invention which is claimed below.

What is claimed is:

1. A method for identifying a macro-organism having a region of at least partially transparent tissue, said method comprising the steps of:
    providing at least one tag, each said tag comprising an identification code comprising at least one fluorescent colorant which emits visible fluorescent light when illuminated;
    implanting each said tag into the region of at least partially transparent tissue, such that each said tag is visible;
    illuminating said macro-organism with light of a first wavelength range;
    reading each said identification code by measuring the spectrum of emitted visible fluorescent light.

2. A method for identifying a macro-organism having a region of at least partially transparent tissue, said method comprising the steps of:
    providing at least one tag, each said tag comprising an identification code comprising at least one fluorescent colorant;
    implanting each said tag into the region of at least partially transparent tissue, such that each said tag is visible;
    providing an illuminating source emitting light of a first wavelength range;
    measuring the spectrum of ambient light from a detection area which includes at least said region of partially transparent tissue, without said light of a first wavelength range from said illuminating source;
    illuminating said macro-organism with said light of a first wavelength range from said illuminating source;
    reading said identification code by:
        measuring the spectrum of ambient light including emitted fluorescent light from said detection area while the macro-organism is illuminated with said light of a first wavelength range; and
        subtracting the measured spectrum of ambient light without illumination with said light of a first wavelength range from the measured spectrum of ambient light while the macro-organism is illuminated with said light of a first wavelength range.

3. The method of claim 2, wherein said first wavelength range of said illuminating light lies outside the spectrum of said emitted fluorescent light.

4. The method of claim 3, wherein said at least one fluorescent colorant comprises dyes.

5. The method of claim 4, wherein each said identification code comprises a single dye.

6. The method of claim 4, wherein each said identification code comprises at least one invisible-blue dye.

7. The method of claim 3, wherein said at least one fluorescent colorant comprises pigments.

8. The method of claim 7, wherein each said identification code comprises more than one pigment.

9. A visible implant tag for identifying a macro-organism comprising a tag structure sized and shaped so as to be insertible into the tissue of a macro-organism, said tag comprising an identification code comprising a plurality of fluorescent colorants.

10. The visible implant tag of claim 9, wherein said fluorescent colorants comprise dyes.

11. The visible implant tag of claim 9, wherein said fluorescent colorants comprise pigments.

12. The visible implant tag of claim 9, wherein at least one of said fluorescent colorants comprises an invisible blue dye.

* * * * *

UNITED STATES PATENT AND TRADEMARK OFFICE
CERTIFICATE OF CORRECTION

PATENT NO. : 5,324,940
DATED : June 28, 1994
INVENTOR(S) : Philip A. Ekstrom

It is certified that error appears in the above-identified patent and that said Letters Patent is hereby corrected as shown below:

Column 3, line 57, Change "FIG. 3" to --FIG. 1--.
Column 5, line 25, Change "eve" to --even--.

Signed and Sealed this

Thirteenth Day of December, 1994

Attest:

BRUCE LEHMAN

Attesting Officer     *Commissioner of Patents and Trademarks*